United States Patent [19]
Wartmann et al.

[11] Patent Number: 6,028,720
[45] Date of Patent: Feb. 22, 2000

[54] HIGH RESOLUTION OBJECTIVE FOR LARGE-FORMAT PHOTOGRAPHY

[75] Inventors: Rolf Wartmann, Hallgarten; Udo Schauss, Waldböckelheim, both of Germany

[73] Assignee: Jos. Schneider Optische Werke Kreuznach GmbH & Co. KG, Bad Kreuznach, Germany

[21] Appl. No.: 09/206,848

[22] Filed: Dec. 7, 1998

[30] Foreign Application Priority Data

Dec. 10, 1997 [DE] Germany ............................ 197 54 758

[51] Int. Cl.[7] ...................................................... G02B 9/62
[52] U.S. Cl. ........................ 359/758; 359/754; 359/756; 359/771; 359/781; 359/782
[58] Field of Search ........................... 359/754, 756–758, 359/781–782, 776–777, 771

[56] References Cited

U.S. PATENT DOCUMENTS

| | | | |
|---|---|---|---|
| 1,777,262 | 9/1930 | Hasselkus et al. ...................... | 350/469 |
| 3,302,991 | 2/1967 | Bechtold .................................. | 350/469 |
| 3,592,531 | 7/1971 | McCrobie ................................ | 350/220 |
| 3,817,599 | 6/1974 | McCrobie ................................ | 350/183 |

*Primary Examiner*—Hung Xuan Dang
*Assistant Examiner*—David N. Spector
*Attorney, Agent, or Firm*—Herbert Dubno

[57] ABSTRACT

A high-resolution objective for large-format photography has a pair of positive meniscuses flanking a stop area forming a lens aperture; and a respective negative cemented doublet on a side of each meniscus turned away from the stop area, the positive meniscuses being composed of glass having anomalous partial dispersion, a refractive index $n_e<1.63$ and a dispersion or Abbe number $v_e>63$, the cemented doublets each having a negative lens element and a positive lens element, the negative lens element being composed of a lead-free, arsenic-free and antimony-free glass with an anomalous dispersion, a refractive index $n_e>1.63$ and an Abbe number $v_e<50$.

6 Claims, 1 Drawing Sheet

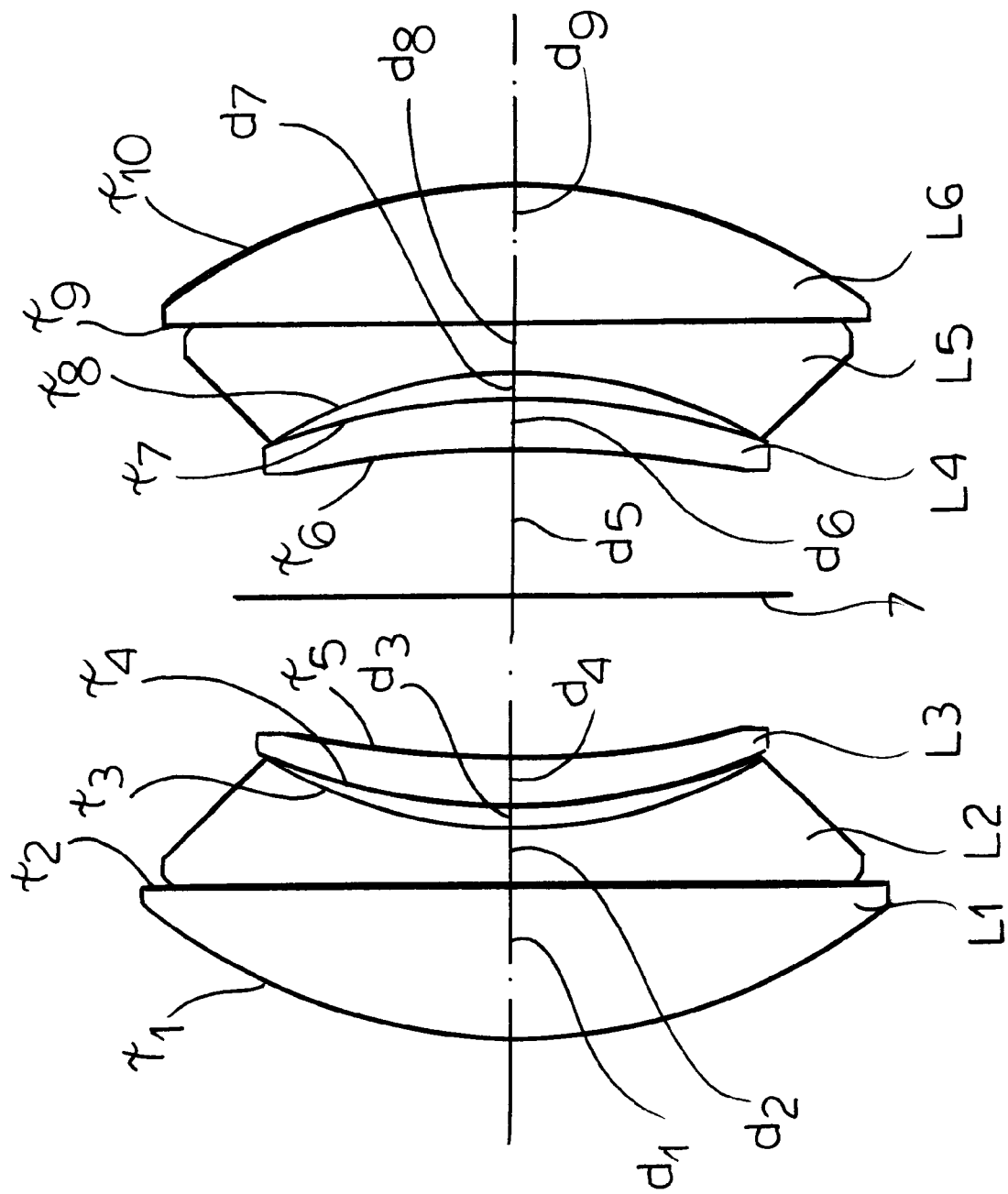

HIGH RESOLUTION OBJECTIVE FOR LARGE-FORMAT PHOTOGRAPHY

FIELD OF THE INVENTION

The present invention relates to large-format photographic objectives and, more particularly, to a high-resolution objective lens for large-format photography.

BACKGROUND OF THE INVENTION

The resolution capability of photographic films has substantially improved in recent decades. This has resulted in a trend to increasingly smaller film formats and increased requirements on the image-forming optics. The emergence of digital rear units for large-format photography has further accelerated this development. Hence modern objectives for large-format photography are desirable, which enable free selection of positions of the film plane in terms of shift and tilt.

Objective lenses for large-format photography are generally wide-angle lenses which have to be as free from distortion as possible. Reductions in F stop are acceptable with such objective lenses as long as they are within the limits permitted by diffraction parameters which define the smallest resolvable structure. This makes it possible to tilt the film plane with respect to the optical axis of the objective lens and shift it in all directions. These special possibilities allow substantial correction of the image-perspective errors. Manipulations of the focal range are also possible. Known standard objective lenses for large-format photography generally have an aperture ratio of 1:5.6 (F 5.6) or 1:4 (F 4), an apochromatic correction of the longitudinal color aberration in the center of the image and, therefore, a high resolution capability. However, this high resolution capability decreases very quickly with increasing image height so that, in order to achieve a typical image definition of 20 Lp/mm, the lens has to be stopped down to F 22.

However, a 1:22 operating stop (F 22) is no longer acceptable nowadays. The diffraction-dependent resolution capability is so low with this F- stop that the possibilities of present day film material go largely unexploited. Higher apertures are necessary to meet the resolution capability of a modern film. In most cases, this means a working F-number of 1:16 (F 16) or 1:11 (F 11). Sometimes even 1:8 (F 8) is necessary. The resolution capability demanded by the objective lenses in this case lies between 30 and 50 Lp/mm. This can only be achieved in the image center by currently known large-format objectives.

Such a typical standard objective lens is described in DE PS 1 258 134. Although this six-element objective lens has an apochromatically corrected longitudinal color aberration, it is not suitable for higher F stops. The reason for this lies in inadequate field flatness and excessive coma. While with an F stops of 22 a resolution capability of approximately 20 Lp/mm is achieved, this is inadequate from the present viewpoint. This resolution capability even decreases in the field at apertures of F 16 or F 11. The apochromatic correction of the longitudinal color aberration is achieved in this objective lens by means of cemented diverging (negative) lens elements made of glass with a low refractive index and anomalous partial dispersion. Only the short flint types, i.e. glass types with a high antimony content, are feasible for this type of glass. Since-antimony is highly poisonous, these objective lenses must also be classed as questionable from the point of view of environmental compatibility. This results in a further considerable disadvantage of the standard objective lenses which require short flint glass in the production of the negative components of the cemented lens element, as prescribed in DE PS 1 258 134.

OBJECTS OF THE INVENTION

It is the principal object of the present invention to provide an objective lens for large-format photography which is virtually diffraction-limited not only at F 22 but also with apertures of F 16 and F 11, this requires a substantial improvement in particular in the field flatness and coma in comparison to prior art lenses.

A further object of the invention is to provide an improved objective for large-format photography, all of the lens components of which are made from lead-free, arsenic-free and antimony-free glass.

SUMMARY OF THE INVENTION

These objects and others which will become apparent hereinafter are attained, in accordance with the invention by a high-resolution objective lens for large-format photography, which comprises six lens elements combined to form four members. The lens elements arranged on both sides of the aperture are two positive (converging) meniscus elements, and adjoining these respective two-element cemented negative components are arranged each on both sides of the aperture area. The lens elements of this two-element component each have refractive indices increasing outwards, starting from the stop area, the divergent or negative lens elements of which are made of a glass with anomalous partial dispersion. The types of glass from which the meniscus lenses are made have a refractive index $n_e<1.63$ and a dispersion or Abbe number $v_e>63$. The divergent or negative lenses contained in the cemented members can be made of a glass with a refractive index $n_e<1.6$ with an Abbe number of $v_e>50$.

The objective according to the invention can have ±5% tolerance in the thicknesses and distances calculated on the basis of the focal length, ±10% variation of surface power, calculated on the basis of the respective value thereof, ±0.03 deviation of the refractive indices and ±3 deviations of the Abbe numbers, calculated on the basis of the spectral line e.

It was possible to relieve the strain on the two outer components by this shift of emphasis in respect of the chromatic correction. These components were constructed as negative cemented doublets. Because of this strain relief, it was possible to find another refractive power combination, which noticeably reduced both coma and the field curvature. Thus, as a result, an objective lens is provided which supplies excellent results free from image aberration even with an aperture ratio of 1:11 (F 11).

BRIEF DESCRIPTION OF THE DRAWING

The above and other objects, features, and advantages will become more readily apparent from the following description, reference being made to the accompanying drawing, the sole FIGURE of which is a diagrammatic axial cross section view through a higher resolution objective for large-format photography according to the invention.

SPECIFIC DESCRIPTION

The high-resolution objective lens for large-format photography comprises, according to the invention, a total of six lens elements, of which the two inner lens elements L3 and L4 covering (enclosing) the aperture area are two positive meniscus lenses made of glass with anomalous partial dispersion. The adjoining two-element cemented doublets L1, L2 and L5, L6 arranged each on both sides of the aperture area comprise diverging lens elements L2 and L5 which are made of a glass with anomalous dispersion. However, according to the to invention, instead of the diverging lenses L2 and L5 of the two cemented members, their converging components L1 and L6 may be made of a glass with anomalous dispersion. The two positive meniscus lenses L3 and L4, whose concave sides face one another, bracket the diaphragm provided with the aperture and referred to as the stop area.

The lens elements have refractive indices increasing outwards, starting from the stop area. The types of glass which the meniscus lenses L3 and L4 are made of have a refractive index $n_e<1.63$ and a dispersion or Abbe number $v_e>63$.

More specifically, the high resolution objective for large-format photography can comprise:

a pair of positive meniscuses flanking a stop area forming a lens aperture; and a respective negative cemented doublet on a side of each meniscus turned away from the stop area, the positive meniscuses being composed of glass having anomalous partial dispersion, a refractive index $n_e<1.63$ and an Abbe number $v_e>63$, the cemented doublets each having a negative lens element and a positive lens element, the negative lens element being composed of a lead-free, arsenic-free and antimony-free glass with an anomalous dispersion, a refractive index $n_e>1.63$ and an Abbe number $v_e<50$. Instead of the negative lens elements of both the doublets being composed of a glass of anomalous dispersion, their positive parameters—L7 and L6 may be composed of a glass of anomalous dispersion. (The compiled orders of magnitude (dimensions) in the relation of all lens elements to each other being the same).

If the first positive lens element at one side of the objective is, therefore, labelled as lens L1, the other lens in order will be labelled as follows: the negative lens element of the doublet containing lens L1 is lens element L2 and the positive meniscus adjacent the first doublet is lens L3. The positive meniscus on the other side of the diaphragm (7) is lens L4 and lens L5 is the negative lens of the other doublet against this meniscus L4 while the positive lens on the opposite side of the second doublet is lens L6. The radii of lens L1 are $r_1$ and $r_2$, the radii of lens L2 are $r_2$ and $r_3$, the radii of lens L3 are $r_4$ and $r_5$, the radii of meniscus L4 are $r_6$ and $r_7$, the radii of lens L5 are $r_8$ and $r_9$ and the radii of lens L6 are $r_9$ and $r_{10}$. The cemented surfaces therefore are of the curvature of radii $r_2$ and $r_9$.

Preferably, in a first embodiment of the invention for an objective of the focal length f':

| | |
|---|---|
| $r_1 =$ | 0.20 . . . 0.26 f' |
| $r_2$ | greater than f' |
| $r_3 =$ | 0.17 . . . 0.23 f' |
| $r_4 =$ | 0.35 . . . 0.65 f' |
| $r_5 =$ | 0.40 . . . 1.00 f' |
| $r_6 =$ | 0.30 . . . 0.57 f' |
| $r_7 =$ | 0.18 . . . 0.26 f' |
| $r_8 =$ | 0.11 . . . 0.18 f' |
| $r_9$ | greater than f' |
| $r_{10} =$ | 0.17 . . . 0.23 f' |

A high resolution objective lens according to this first embodiment is determined by the following data, of which these can have any desired scale and any desired variation of ±5% clearance of the thicknesses and distances calculated on the basis of the focal length, ±10% variation of surface power, calculated on the basis of the respective value thereof, ±0.03 deviation of the refractive indices and ±3 deviation of the Abbe number calculated on the basis of the spectral line e:

In a first example, where the thicknesses and spacings have the following values (see the drawing), the lens L1 will have the thickness $d_1$ along the optical axis, the lens L2 shall have the thickness $d_2$, the spacing between the first doublet and the first meniscus shall be represented at $d_3$, the thickness of the first meniscus L3 is $d_4$, the spacing between the meniscus is represented at $d_5$, the second meniscus L4 will have the thickness $d_6$, the spacing between the second meniscus and the second doublet will be $d_7$, the negative lens L5 of the second doublet will have a thickness $d_8$ and the positive lens of the second doublet will have a thickness $d_9$. In the first embodiment the preferred values then are:

| F-number 1:5.6 | | | |
|---|---|---|---|
| | | $n_o$ | $v_o$ |
| $r_1 = 35.34$ | | | |
| | $d_{1 = 9.7}$ | 1.6808 | 55.1 |
| $r_2 = 327.89$ | | | |
| | $d_{2 = 2.9}$ | 1.6167 | 44.2 |
| $r_3 = 29.88$ | | | |
| | $d_{3 = 3.1}$ | | |
| $r_4 = 76.40$ | | | |
| | $d_{4 = 2.8}$ | 1.4891 | 70.2 |
| $r_5 = 126.46$ | | | |
| | $d_{5 = 17.31}$ | | |
| $r_6 = -62.15$ | | | |
| | $d_{6 = 3.8}$ | 1.4891 | 70.2 |
| $r_7 = -33.37$ | | | |
| | $d_{7 = 2.1}$ | | |
| $r_8 = -22.20$ | | | |
| | $d_{8 = 2.9}$ | 1.6167 | 44.2 |
| $r_9 = -177.21$ | | | |
| | $d_{9 = 9.0}$ | 1.6808 | 55.1 |
| $r_{10} = -30.39$ | | | | f' = 151.2
s' = 128.1

According to a second embodiment, the following orders of magnitude were adhered to in relation to one another between the individual lens elements:

| | |
|---|---|
| $r_1 =$ | 0.18 . . . 0.24 f' |
| $r_2$ | greater then f' |
| $r_3 =$ | 0.12 . . . 0.18 f' |
| $r_4 =$ | 0.16 . . . 0.30 f' |
| $r_5 =$ | 0.27 . . . 0.50 f' |
| $r_6 =$ | 0.27 . . . 0.50 f' |
| $r_7 =$ | 0.16 . . . 0.30 f' |
| $r_8 =$ | 0.12 . . . 0.18 f' |
| $r_9$ | greater then f' |
| $r_{10} =$ | 0.16 . . . 0.24 f' |

A high-resolution objective lens according to this second embodiment is determined by the following data, of which these can have any desired scale and any desired variation of ±5% clearance of the thicknesses and distances calculated on the basis of the focal length, ±10% variation of surface power, calculated on the basis of the respective value thereof, ±0.03 deviation of the refractive indices and ±3 deviation of the Abbe number calculated on the basis of the spectral line e.

Specific values for the second embodiment are as follows:

F-number 1:5.6

|  |  | $n_o$ | $v_o$ |
|---|---|---|---|
| $r_1 = 19.98$ |  |  |  |
|  | $d_1 = 6.09$ | 1.6052 | 65.1 |
| $r_2 = -2744.0$ |  |  |  |
|  | $d_2 = 1.8$ | 1.5498 | 53.3 |
| $r_3 = 14.74$ |  |  |  |
|  | $d_3 = 1.2$ |  |  |
| $r_4 = 23.35$ |  |  |  |
|  | $d_4 = 1.8$ | 1.5223 | 69.5 |
| $r_5 = 34.66$ |  |  |  |
|  | $d_5 = 11.38$ |  |  |
| $r_6 = -46.19$ |  |  |  |
|  | $d_6 = 1.8$ | 1.5302 | 76.6 |
| $r_7 = -28.98$ |  |  |  |
|  | $d_7 = 1.2$ |  |  |
| $r_8 = -16.28$ |  |  |  |
|  | $d_8 = 2.07$ | 1.5498 | 53.3 |
| $r_9 = -428.18$ |  |  |  |
|  | $d_9 = 5.2$ | 1.6052 | 65.1 |
| $r_{10} = -20.10$ |  |  |  | f' = 101.2
s' = 84.3

According to a further variant, this high-resolution objective lens according of the second embodiment is determined by the following data, of which these can likewise have any desired scale and any desired variation of ±5% clearance of the thicknesses and distances calculated on the basis of the focal length, ±10% variation of surface power, calculated on the basis of the respective value thereof, ±0.03 deviation of the refractive indices and ±3 deviation of the Abbe numbers calculated on the basis of the spectral line e:

F-number 1:5.6

|  |  | $n_o$ | $v_o$ |
|---|---|---|---|
| $r_1 = 34.28$ |  |  |  |
|  | $d_1 = 9.7$ | 1.6808 | 55.1 |
| $r_2 = 181.92$ |  |  |  |
|  | $d_2 = 2.9$ | 1.6167 | 44.2 |
| $r_3 = 27.68$ |  |  |  |
|  | $d_3 = 2.4$ |  |  |
| $r_4 = 68.56$ |  |  |  |
|  | $d_4 = 2.5$ | 1.4891 | 70.2 |
| $r_5 = 130.55$ |  |  |  |
|  | $d_5 = 17.36$ |  |  |
| $r_6 = -59.48$ |  |  |  |
|  | $d_6 = 2.7$ | 1.4891 | 70.2 |
| $r_7 = -33.08$ |  |  |  |
|  | $d_7 = 1.9$ |  |  |
| $r_8 = -22.24$ |  |  |  |
|  | $d_8 = 2.8$ | 1.6167 | 44.2 |
| $r_9 = -173.12$ |  |  |  |
|  | $d_9 = 9.0$ | 1.6808 | 55.1 |
| $r_{10} = -29.98$ |  |  |  | f' = 151.4
s' = 129.6

We claim:

1. A high-resolution objective for large-format photography, comprising six lens elements, of which the two lens elements covering the stop area are two positive Meniscus lenses, and adjoining these on both sides a respective two-element cemented negative unit is arranged, the lens elements of which have refractive indices increasing outwards, starting from the stop area, characterized in that the positive meniscus lenses (L3 and L4) are made of glass of anomalous partial dispersion, that they have a refractive index $n_e<1.63$ and an Abbe number $v_e>63$, that the negative lens (L2, L5) contained in the cemented units (L1, L2; and L5, L6;) are made of a glass with anomalous dispersion with a refractive index $N_e>1.6$ and with an Abbe-number $v_e<50$, so that the glass of negative lens elements (L2, L5) is lead-, arsenic- and antimony-free, and that the following orders of magnitude are adhered to in relation to one another between the individual lens elements:

| $r_1 =$ | 0.20 ... 0.26 f' |
|---|---|
| $r_2$ | greater than f' |
| $r_3 =$ | 0.17 ... 0.23 f' |
| $r_4 =$ | 0.35 ... 0.65 f' |
| $r_5 =$ | 0.40 ... 1.00 f' |
| $r_6 =$ | 0.30 ... 0.57 f' |
| $r_7 =$ | 0.18 ... 0.26 f' |
| $r_8 =$ | 0.11 ... 0.18 f' |
| $r_9$ | greater than f' |
| $r_{10} =$ | 0.17 ... 0.23 f'. |

2. High-resolution objective lens, comprising six lens elements, of which the two lens elements covering the stop area are two positive meniscus lenses, and adjoining these on both sides a respective two-element cemented negative unit is arranged, the lens elements of which have refractive indices increasing outwards, starting from the stop area, characterized in that the positive meniscus lenses (L3 and L4) are made of glass of anomalous partial dispersion, that they have a refractive index $n_e<1.63$ and an Abbe number $v_e>63$, that the positive lens elements (L1, L6) contained in the cemented units (L1, L2; and L5, L6) are made of glass with anomalous dispersion, and that the following orders of magnitude are adhered to in relation to one another between the individual lens elements:

| $r_1 =$ | 0.20 ... 0.26 f' |
|---|---|
| $r_2$ | greater than f' |
| $r_3 =$ | 0.17 ... 0.23 f' |
| $r_4 =$ | 0.35 ... 0.65 f' |
| $r_5 =$ | 0.40 ... 1.00 f' |
| $r_6 =$ | 0.30 ... 0.57 f' |
| $r_7 =$ | 0.18 ... 0.26 f' |
| $r_8 =$ | 0.11 ... 0.18 f' |
| $r_9$ | greater than f' |
| $r_{10} =$ | 0.17 ... 0.23 f'. |

3. The high-resolution objective defined in claim 1 wherein, the positive lens element L1 of a first of said doublets has radii $r_1$ and $r_2$ and a thickness $d_1$, the negative lens element L2 of said first doublet has radii $r_2$ and $r_3$ and a thickness $d_2$, a first meniscus L3 adjacent said first doublet has a space $d_3$ therefrom along an optical axis of the objective and radii $r_4$ and $r_5$, a second positive meniscus is spaced by a distance $d_5$ along said optical axis has radii $r_6$ and $r_7$ and a thickness $d_6$, the negative lens element of the other doublet is spaced by a distance $d_7$ from said other meniscus and has radii $r_8$ and $r_9$ and a thickness $d_8$, and said positive lens element of said other doublet has radii $r_9$ and $r_{10}$ and a thickness $d_9$, and wherein

| $r_1 =$ | 0.18 ... 0.24 f' |
|---|---|
| $r_2$ | greater than f' |
| $r_3 =$ | 0.12 ... 0.18 f' |

-continued

| | |
|---|---|
| $r_4 =$ | 0.16 ... 0.30 f' |
| $r_5 =$ | 0.27 ... 0.50 f' |
| $r_6 =$ | 0.27 ... 0.50 f' |
| $r_7 =$ | 0.16 ... 0.30 f' |
| $r_8 =$ | 0.12 ... 0.18 f' |
| $r_9$ | greater than f' |
| $r_{10} =$ | 0.16 ... 0.24 f' | with a tolerance of ±5% in said thicknesses and distances ±10% of surface power, ±0.03 in refractive index and ±3 in Abbe number.

4. The high-resolution objective defined in claim 1 or claim 2 wherein the objective conforms to the following parameters:

F-number 1:5.6

| | | $n_o$ | $v_o$ |
|---|---|---|---|
| $r_1 = 34.28$ | | | |
| | $d_1 = 9.7$ | 1.6808 | 55.1 |
| $r_2 = 181.92$ | | | |
| | $d_2 = 2.9$ | 1.6167 | 44.2 |
| $r_3 = 27.68$ | | | |
| | $d_3 = 2.4$ | | |
| $r_4 = 68.56$ | | | |
| | $d_4 = 2.5$ | 1.4891 | 70.2 |
| $r_5 = 130.55$ | | | |
| | $d_5 = 17.36$ | | |
| $r_6 = -59.48$ | | | |
| | $d_6 = 2.7$ | 1.4891 | 70.2 |
| $r_7 = -33.08$ | | | |
| | $d_7 = 1.9$ | | |
| $r_8 = -22.24$ | | | |
| | $d_8 = 2.8$ | 1.6167 | 44.2 |
| $r_9 = -173.12$ | | | |
| | $d_9 = 9.0$ | 1.6808 | 55.1 |
| $r_{10} = -29.98$ | | | | f' = 151.4
s' = 129.6 with a tolerance of ±5% in said thicknesses and distances ±10% of surface power, ±0.03 in refractive index and ±3 in Abbe number.

5. The high-resolution objective defined in claim 1 or claim 2 wherein the objective conforms to the following parameters:

F-number 1:5.6

| | | $n_o$ | $v_o$ |
|---|---|---|---|
| $r_1 = 19.98$ | | | |
| | $d_1 = 6.09$ | 1.6052 | 65.1 |
| $r_2 = -2744.0$ | | | |
| | $d_2 = 1.8$ | 1.5498 | 53.3 |
| $r_3 = 14.74$ | | | |
| | $d_3 = 1.2$ | | |
| $r_4 = 23.35$ | | | |
| | $d_4 = 1.8$ | 1.5223 | 69.5 |
| $r_5 = 34.66$ | | | |
| | $d_5 = 11.38$ | | |
| $r_6 = -46.19$ | | | |
| | $d_6 = 1.8$ | 1.5302 | 76.6 |
| $r_7 = -28.98$ | | | |
| | $d_7 = 1.2$ | | |
| $r_8 = -16.28$ | | | |
| | $d_8 = 2.07$ | 1.5498 | 53.3 |
| $r_9 = -428.18$ | | | |
| | $d_9 = 5.2$ | 1.6052 | 65.1 |
| $r_{10} = -20.10$ | | | | f' = 101.2
s' = 84.3 with a tolerance of ±5% in said thicknesses and distances ±10% of surface power, ±0.03 in refractive index and ±3 in Abbe number.

6. The high-resolution objective defined in claim 1 or claim 2 wherein the objective conforms to the following parameters:

F-number 1:5.6

| | | $n_o$ | $v_o$ |
|---|---|---|---|
| $r_1 = 30.03$ | | | |
| | $d_1 = 9.0$ | 1.6052 | 65.1 |
| $r_2 = -1665.0$ | | | |
| | $d_2 = 2.9$ | 1.5498 | 53.3 |
| $r_3 = 22.14$ | | | |
| | $d_3 = 1.64$ | | |
| $r_4 = 34.22$ | | | |
| | $d_4 = 2.5$ | 1.5302 | 76.6 |
| $r_5 = 50.85$ | | | |
| | $d_5 = 17.95$ | | |
| $r_6 = -68.98$ | | | |
| | $d_6 = 2.7$ | 1.5302 | 76.6 |
| $r_7 = -43.75$ | | | |
| | $d_7 = 1.7$ | | |
| $r_8 = -24.40$ | | | |
| | $d_8 = 2.8$ | 1.5498 | 53.3 |
| $r_9 = -641.5$ | | | |
| | $d_9 = 8.05$ | 1.6052 | 65.1 |
| $r_{10} = -30.26$ | | | | f' = 152.3
s' = 125.9 with a tolerance of ±5% in said thicknesses and distances ±10% of surface power, ±0.03 in refractive index and ±3 in Abbe number.

* * * * *